(12) United States Patent
Liao et al.

(10) Patent No.: US 6,665,041 B2
(45) Date of Patent: Dec. 16, 2003

(54) LIQUID CRYSTAL ON SILICON PANEL IN SINGLE-DOMAIN VERTICAL ALIGNMENT MODE

(75) Inventors: Bing-Jei Liao, Pingtung (TW); Chung-Yuan Liu, Tainan (TW)

(73) Assignee: Himax Optoelectronics Corp. (TW)

( * ) Notice: Subject to any disclaimer, the term of this patent is extended or adjusted under 35 U.S.C. 154(b) by 0 days.

(21) Appl. No.: 10/127,413

(22) Filed: Apr. 23, 2002

(65) Prior Publication Data
US 2002/0163610 A1 Nov. 7, 2002

(30) Foreign Application Priority Data
May 3, 2001 (TW) ........................................ 90110668 A (51) Int. Cl.[7] ............................................. G02F 1/1333
(52) U.S. Cl. ........................... 349/160; 349/5; 349/144; 349/191
(58) Field of Search .......................... 349/5, 129, 143, 349/144, 160, 191

(56) References Cited

U.S. PATENT DOCUMENTS 5,452,114 A * 9/1995 Hotta et al. .................. 349/133
5,907,380 A * 5/1999 Lien ............................ 349/141

* cited by examiner

*Primary Examiner*—Robert H. Kim
*Assistant Examiner*—Andrew Schechter
(74) *Attorney, Agent, or Firm*—Rabin & Berdo, PC (57) ABSTRACT

A liquid crystal on silicon (LCOS) panel in single-domain vertical alignment mode. The LCOS includes a front plate, a rear plate, and a liquid crystal layer. The rear plate includes a number of pixel electrodes and the pixel electrodes are grouped in pairs. Every two pairs of pixel electrodes are separated by a groove while the pixel electrodes in each pair are separated by a protrusion. The LCOS panel is filled with the liquid crystal layer, between the front and rear plates, while the liquid crystal molecules in the liquid crystal layer are in vertical alignment mode. By the configuration of the protrusions and grooves among the pixels of the LCOS panel, a single domain is readily formed in every pixel while high contrast ratio, reduced fringe field effect and effect of transverse electric field can be achieved.

9 Claims, 12 Drawing Sheets

LIQUID CRYSTAL ON SILICON PANEL IN SINGLE-DOMAIN VERTICAL ALIGNMENT MODE

This application incorporates by reference of Taiwan application Ser. No. 090110668, filed on May 3, 2001.

BACKGROUND OF THE INVENTION

1. Field of the Invention

The invention relates in general to a liquid crystal on silicon (LCOS), and more particularly to a vertical alignment (VA) mode liquid crystal on silicon capable of forming a single domain.

2. Description of the Related Art

As the market of portable products, e.g., personal digital assistant (PDA), cellular phone, and projector, and large-sized projection television progress, more and more customers require that the resolutions of these portable products or the projection television are to be identical to that of personal computer systems. Liquid crystal on silicon (LCOS) is just enough to fulfil these requirements. Unlike liquid crystal display (LCD) whose the front and rear plates are made of glass, LCOS employs a silicon plate and glass plate between which liquid crystal is filled. The structure of LCOS can provide displays not only meeting the requirement for compactness of portable products, but also having high resolution. The resolution of a display is represented by pixels formed on the plates. The more the pixels a display has, the finer and the resolution the display can show. In addition, LCOS is capable of having its driving circuit manufactured by using semiconductor manufacturing process, e.g., complementary metal oxide semiconductor manufacturing process so that the silicon plate that uses silicon wafer can be manufactured in a standard semiconductor manufacturing production line. Therefore, it is unnecessary to invest additionally in the production equipment while the resolution of the LCOS is higher than that of the LCD, which requires glass-manufacturing process.

Figure 1A:
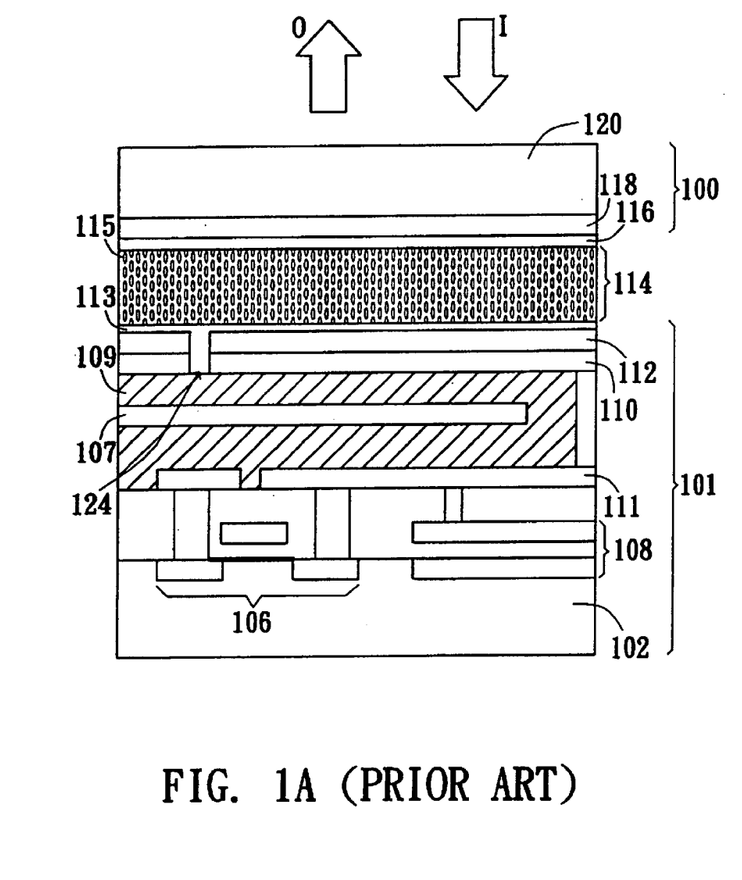
FIG. 1A is a cross-sectional view of a single pixel of reflective liquid crystal on silicon panel.

Liquid crystal on silicon can be categorized into transmissive type and reflective type while major research and development focus on the reflective type. FIG. 1A shows a single pixel on a reflective-type LCOS in a cross-sectional view. The LCOS has a front plate 100 and a rear plate 101. The rear plate 101 includes a silicon substrate 102 on which a thin film transistor 106, an opaque layer 107, and a capacitor 108 are formed. The thin film transistor 106 is used for controlling the operation of the pixel, the opaque layer 107 is used for making the thin film transistor 106 from not being shined so as to avoid misoperation, and the capacitor 108 is used for maintaining the brightness of the pixel. A metal layer 111 is electrically coupled to the thin film transistor 106 and the capacitor 108 while the metal layer 111 is covered with an insulating layer 109. In addition, a pixel electrode 110 is disposed above the insulating layer 109 and is covered with a reflector 112. As to the front plate 100, a glass plate 120 is included and a transparent electrode (indium-tin-oxide electrode) 118 is formed on the glass plate 120. The front plate 100 and the rear plate 101 are assembled in parallel and the space between them is filled with liquid crystal molecules 115 so as to form a liquid crystal layer 114. Further, alignment films 113 and 116 for molecular alignment are formed on the reflector 112 and the transparent electrode 118.

By the above structure, a light signal having brightness corresponding to a voltage applied to the pixel electrode 110 is obtained. When an incident ray (denoted by I, as shown in FIG. 1A) that is normal to the liquid crystal layer 114 strikes the glass plate 120, a reflected ray (denoted by O) is reflected by the reflector 112. The polarization of the light passing through the liquid crystal layer 114 is modulated by changing the alignment of the liquid crystal molecules 115 that is varying with a voltage applied to the pixel electrode 110. After that, the reflected ray is processed by the polarizing film (not shown in FIG. 1A) formed on the glass plate 120. In this way, the polarized reflected ray has the brightness corresponding to the voltage applied to the pixel electrode 110.

Figure 1B:
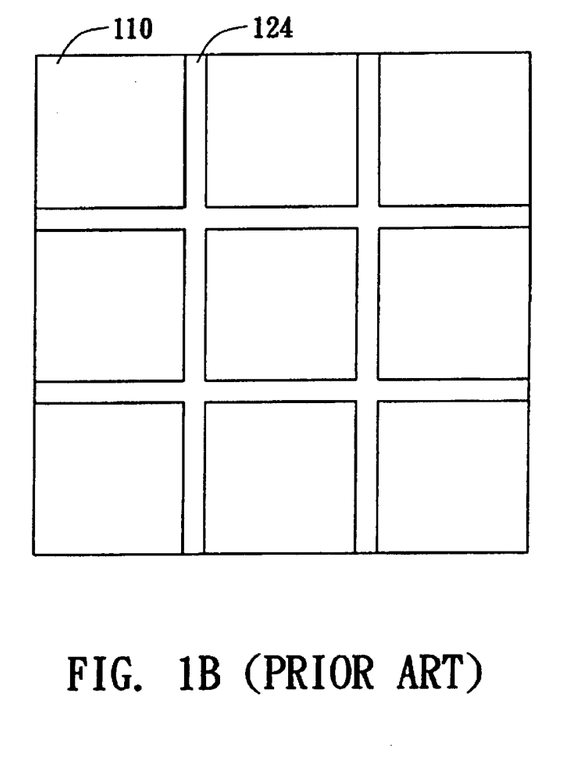
FIG. 1B is a top view of the liquid crystal on silicon panel.

FIG. 1B illustrating an LCOS in a top view. As shown, each of the pixel electrodes 110 is isolated with grooves 124, wherein the bottoms of the grooves 124 are covered with the alignment film 113.

Figure 2A:
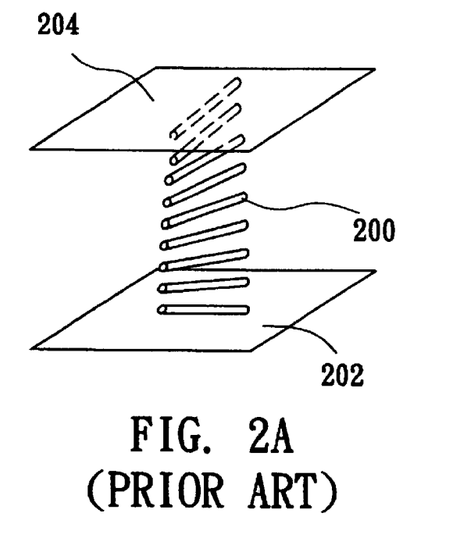
FIGS. 2A–2B show the operations of liquid crystal molecules in twisted nematic mode when a voltage is not applied or applied, respectively.
Figure 2B:
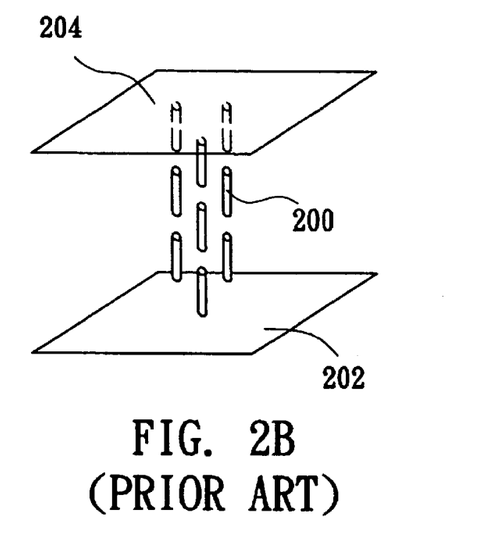
Figure 3A:
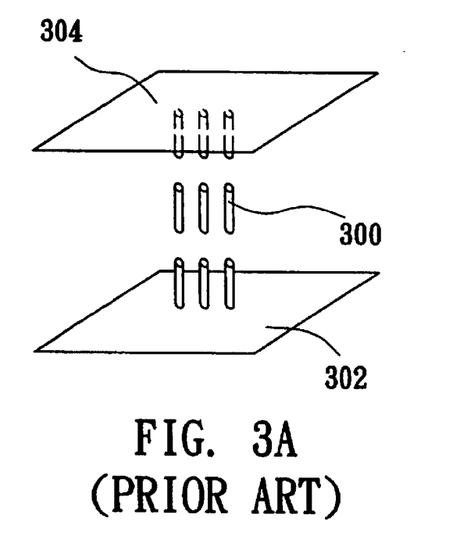
FIGS. 3A–3B show the operations of liquid crystal molecules in vertical alignment mode when a voltage is not applied or applied, respectively.
Figure 3B:
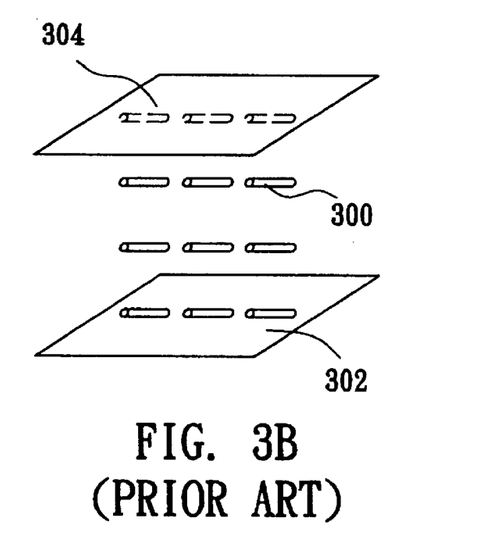

To be more specific, when a voltage is applied to the pixel electrodes 110, the arrangement of the liquid crystal molecules is to be varied so that the light transmission changes. Thus, the LCOS can display images with different brightness such as white, black, and intermediate gray scale. In addition, the molecules of the liquid crystal layer of LCOS panels can be categorized into twisted nematic mode (TN) and vertical alignment mode (VA). FIGS. 2A–2B show the operations of liquid crystal molecules in twisted nematic mode when a voltage is not applied or applied to the liquid crystal molecules, respectively. When an electric field is not applied across the alignment films 202 and 204, the liquid crystal molecules 200 gradually twist layer by layer until the uppermost layer is at a 90° angle to the bottom layer, as shown in FIG. 2A. When a sufficient electric field is applied, the liquid crystal molecules 200 are to be aligned and parallel to the direction of the electric field, as shown in FIG. 2B. FIGS. 3A–3B show the operations of liquid crystal molecules in vertical alignment mode when a voltage is not applied or is applied to the liquid crystal molecules, respectively. When a voltage is not applied across the alignment films 302 and 304, the liquid crystal molecules 300 are aligned and perpendicular to the alignment films 302 and 304, as shown in FIG. 3A. When a voltage is applied, the liquid crystal molecules 300, as shown in FIG. 3B, are to be twisted by an angle of 90° to the direction of the liquid crystal molecules 300 when the voltage is not applied, while they are parallel to the alignment films 302 and 304.

As compared with LCOS panels with liquid crystal molecules in twisted nematic mode, LCOS panels with liquid crystal molecules in vertical alignment mode have higher contrast ratios. A twisted nematic LCOS panel can provide a contrast ratio of about 100:1 to 150:1, but a vertical-alignment LCOS panel can provide a contrast ratio of about 400:1 or above. Therefore, the development of LCOS panels with liquid crystal molecules in vertical alignment mode is interested.

Moreover, the liquid crystal layer 114 can be damaged if a voltage in the sane polarity is continuously applied to the pixel electrode 110. This problem can be avoided by using polarity inversion because the gray levels produced by the LCOS panel is related to the difference between voltages across the liquid crystal layer 114 but not related to the polarities of the voltages. Polarity inversion is a driving method that a voltage of alternate positive and negative is applied to the pixel electrode 110. With respect to polarity inversion, liquid crystal display driving methods can be categorized into frame inversion, column inversion, and dot inversion. The following is to describe the three driving methods briefly.

Figure 4A:
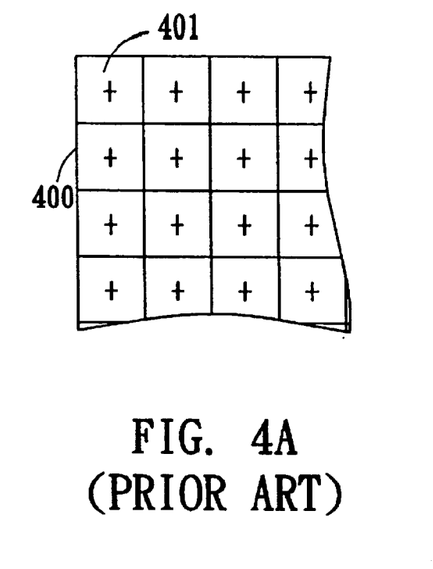
FIG. 4A illustrates the conventional frame inversion driving method for a liquid crystal display (LCD) panel 400.

FIG. 4A illustrates the conventional frame inversion driving method for a liquid crystal display (LCD) panel 400 having a number of pixels 401. The positive sign "+" and negative sign "−", hereinafter, are indicative of polarities of the voltages applied to the associated pixels. In frame inversion, if positive voltages are applied to all pixels at one time, then negative voltages are applied to them in the next time instant. In this way, voltages in positive and negative polarities are alternately applied to them.

Figure 4B:
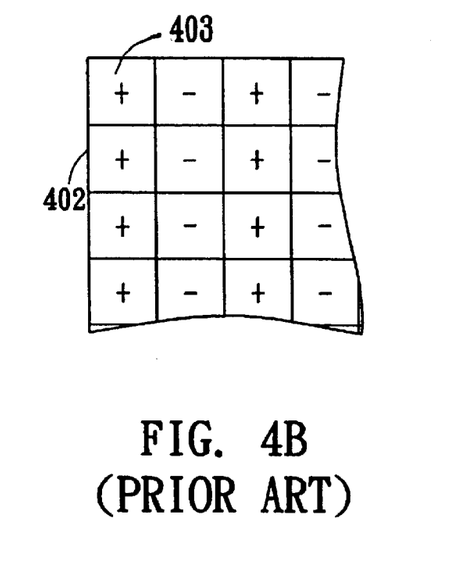
FIG. 4B illustrates the conventional column inversion driving method for an LCD panel 402.
Figure 4C:
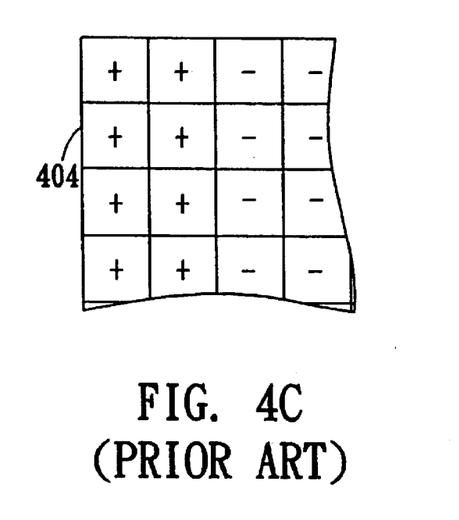
FIG. 4C illustrates the conventional two-column inversion driving method for an LCD panel 404.

FIG. 4B illustrates the conventional column inversion driving method for an LCD panel 402 having a number of pixels 403. In column inversion, polarity inversion occurs on pixels of columns. If positive voltages are applied to a column of pixels, negative voltages are applied to the adjacent column of pixels. In the next time instant, the polarities of voltages applied to the above pixels are inverted. That is, negative voltages are applied to the column of pixels that the positive voltages have been applied to, while positive voltages are applied to the adjacent column of pixels that the negative voltages have been applied to. In this way, the application of voltages in positive and negative polarities to the other columns of pixels changes. In this example, the unit that polarity inversion occurs on is one column of pixels. Naturally, this unit can be extended. For instance, two columns of pixels is as a unit for polarity inversion, as shown in an LCD panel 404 of FIG. 4C, and the corresponding driving method is referred to as two-column inversion.

Figure 4D:
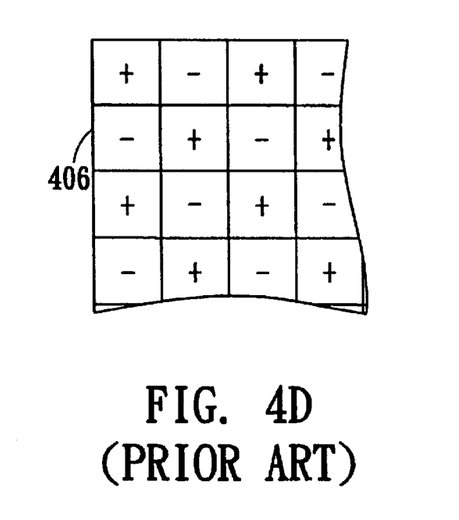
FIG. 4D illustrates the dot inversion driving method for an LCD panel 406.

FIG. 4D illustrates the dot inversion driving method for an LCD panel 406 having a number of pixels, viewed as a number of dots. In dot inversion, the polarity of voltage applied to one pixel is the inverse of that applied to the pixels that surround the one pixel. That is, for one pixel that a negative voltage is applied to, voltages in positive polarity are to be supplied to the pixels adjacent to the one on all sides (left, right, top, and bottom sides). In the next time instant, the polarities for every dot are changed.

Figure 5A:
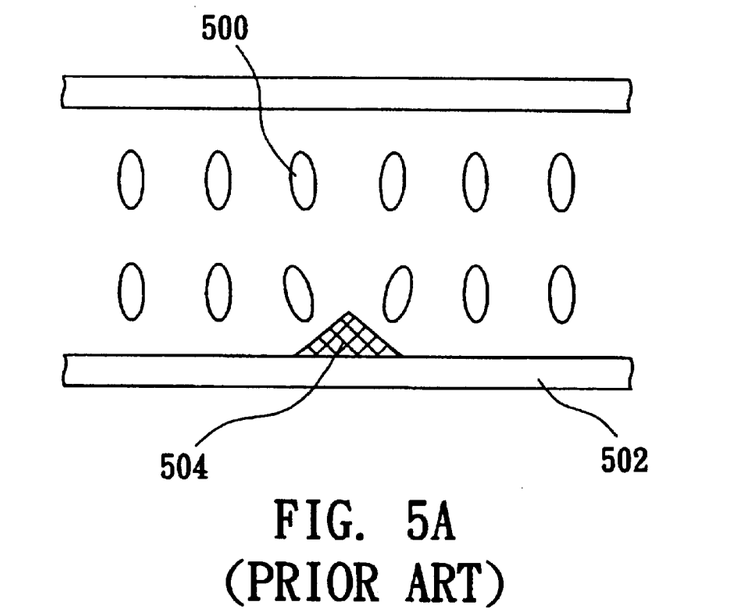
FIGS. 5A and 5B illustrate the arrangement of multi-domain liquid crystal molecules in vertical alignment mode of an LCD panel when a voltage is applied or not applied, respectively.
Figure 5B:
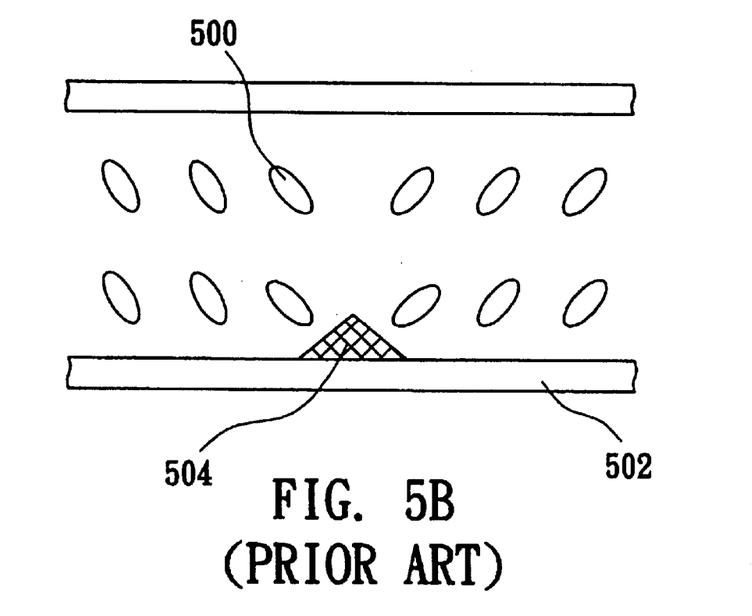

For an LCD panel with a large size, such as panels used in notebook personal computers, a wide visual angle is achieved by forming multi-domains in every single pixel of the panel. FIGS. 5A and 5B illustrate the arrangement of multi-domain liquid crystal molecules in vertical alignment mode of an LCD panel when a voltage is applied or not applied, respectively. For the sake of brevity, the arrangement of the molecules in a single pixel is described. As shown in FIG. 5A, when no voltage is applied, most of the liquid crystal molecules 500 are aligned vertically to a pixel electrode 502. The pixel electrode 502 has a protrusion 504. The liquid crystal molecules adjacent to the protrusion 504 are arranged substantially vertical to the protrusion 504, and have an inclination to the pixel electrode 502. In addition, the molecules on both sides of the protrusion 504 incline to the both sides. When a voltage is applied, as shown in FIG. 5B, two different domain are formed on the single pixel because of the different inclinations of the molecules on the left and right sides of the protrusion 504. To be more specific, the molecules adjacent to the left side of the protrusion 504 affect the left portion of the liquid crystal molecules 500 of the pixel, so that the left portion of molecules incline to the left side. Likewise, the molecules adjacent to the right side of the protrusion 504 affect the right portion of the liquid crystal molecules 500 of the pixel, resulting in the inclination of this portion of molecules to the right side. FIGS. 5A and 5B show the example with only two domains in one single pixel. However, multiple domains can be similarly implemented by changing the shape of the protrusion 504, leading to a wide visual angle.

As an example, in 1997, Fujitsu limited company produces a multi-domain, vertical alignment mode, thin film transistor (TFT) LCD panel having a visual angle of up to 160°. Since the liquid crystal molecules are in vertical alignment mode, the panel has a contrast ratio of up to 300:1. However, the application of protrusions on the plate of the multi-domain panel results in a reduction in its light efficiency.

Unlike LCD technology for use in large-sized panels, LCOS technology is applied to small-sized panels, e.g., the liquid crystal panels for use in projectors or projection televisions. Besides, their LCOS panels are not required to provide wide visual angles. Instead of relying on the panel to provide wide visual angles, a projector with LCOS can employ an enhanced screen as a scattering surface to achieve wide visual angles. Accordingly, the consideration of wide visual angles in LCOS becomes unnecessary and the LCOS is only required to be capable of being struck by incident rays normal to the LCOS and of reflecting normal reflected rays normal to the LCOS. Thus, the formation of one single-domain in each pixel is sufficient. That is, in the present of an electric field for the LCOS, the liquid crystal molecules in a pixel are inclined to one direction other than multi-directions as illustrated in FIG. 5B.

In brief, for meeting the requirements for the incident light and reflection of the reflected light normal to the LCOS panel, the liquid crystal molecules in one single pixel are desired to be of single-domain and no protrusion, for the pixel, is formed on the plate of the LCOS. In addition, liquid crystal molecules in VA mode are chosen in order to provide high contrast ratios. In the following, under different driving methods, the formation of the single-domain vertical alignment in a LCOS panel and its reflection ratios corresponding to the twisted liquid crystal molecules are illustrated, wherein four pixels are involved. Besides, the alignment films employ the rubbing process to cause the liquid crystal molecules to be arranged on the aligning files in particular directions when no voltage is applied. When a sufficient voltage is applied, the liquid crystal molecules incline to fixed directions so as to form a single-domain in each pixel.

Figure 6A:
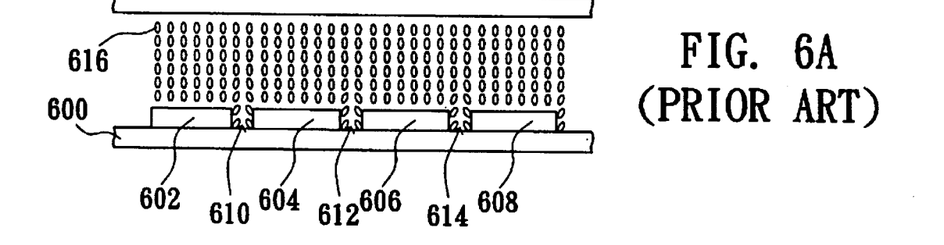
FIG. 6A illustrates a conventional VA mode LCOS when no voltage is applied to a liquid crystal layer of the LCOS.
Figure 6B:
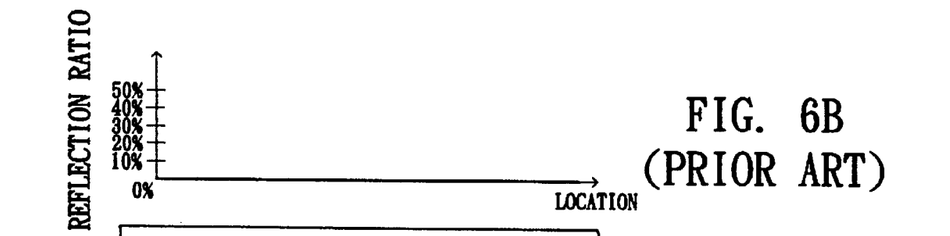
FIG. 6B is a diagram of reflection ratio versus location on the liquid crystal layer shown in FIG. 6A.

FIG. 6A illustrates a conventional VA mode LCOS when no voltage is applied. Pixel electrodes 602, 604, 606, and 608 are formed on an insulating layer 600, and grooves 610, 612, and 614 are formed among the pixel electrodes. FIG. 6B is a diagram of reflection ratio versus location on the liquid crystal layer corresponding to the four pixels shown in FIG. 6A. Since no voltage is applied, most of the liquid crystal molecules 616 are aligned and vertical to the pixel electrodes 602 to 608, resulting in the LCOS having a reflection ratio of 0%.

Figure 7A:
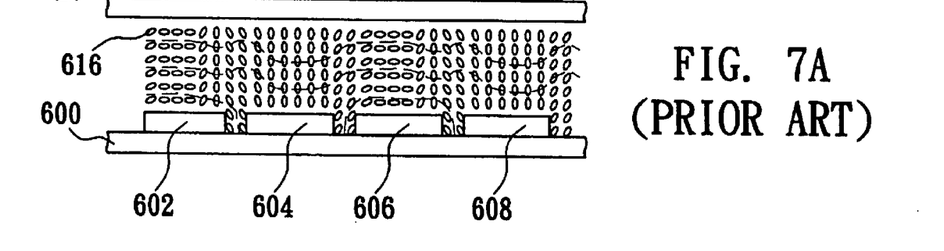
FIG. 7A illustrates the LCOS in FIG. 6A driven by the frame inversion driving method.
Figure 7B:
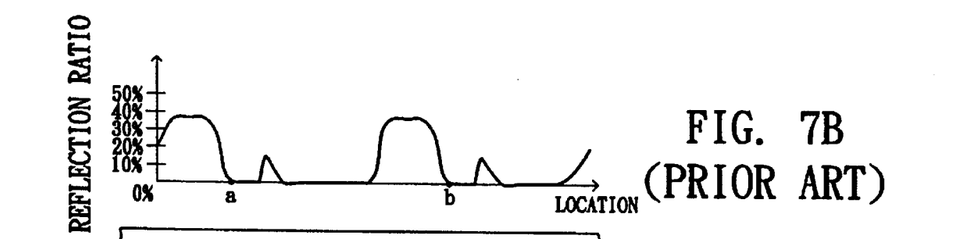
FIG. 7B is a diagram of reflection ratio versus location on the liquid crystal layer in FIG. 7A.

FIG. 7A illustrates the LCOS in FIG. 6A driven by the frame inversion driving method. Referring to FIG. 7B also, a diagram of reflection ratio versus location on the liquid crystal layer in FIG. 7A is shown. In order to display images with different brightness, LCD panels are commonly required to produce different gray levels. Thus, voltages of different levels would be applied to adjacent pixels of the LCOS. For instance, the pixel electrodes 602 and 606 are supplied with a voltage of +3.6 V, while the pixel electrodes 604 and 608 with a voltage of +1.5 V. Due to the voltages supplied, the liquid crystal molecules would twist. As examined from FIG. 7A, the higher the voltages applied to the pixels, the larger the inclination angles of the liquid crystal molecules 616. In addition, the dashed lines in FIG. 7A are indicative of equipotential lines yielded after the voltages are applied to the pixel electrodes 602, 604, 606, and 608. By the pattern of the equipotential lines, the distribution of the electric field in the liquid crystal molecules can be determined. Since fringe field effect occurs on the electric field near the edges of the pixel electrodes 602, 604, 606, and 608, the potential lines near the edges of the pixel electrodes 602, 604, 606, and 608 are distributed irregularly. Besides, because of a potential difference of 3.6−1.5 V=2.1 V between adjacent pixel electrodes, the distribution of the electric field near the edges of the pixel electrodes becomes irregular, resulting in the liquid crystal molecules 606 twisting in irregular directions. Thus, reflection ratios of two points a and b located near the edges of the pixel electrodes 602, 604, 606, and 608 reduce to 0%. In other words, while the liquid crystal molecules, under the application of a voltage of +3.6 V, are expected to provide a reflection ratio of about 40 to 50%, an undesired small gray area occurs on the right side of each of the pixel electrodes 602 and 606, thus degrading the display quality of the pixels. Hence, for LCOS panel, the fringe field effect reduces the brightness of the pixels and even produces black points.

Figure 8A:
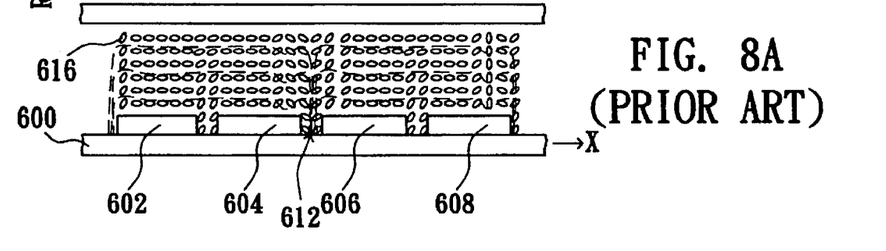
FIG. 8A illustrates the LCOS in FIG. 6A driven by the two-column inversion driving method.
Figure 8B:
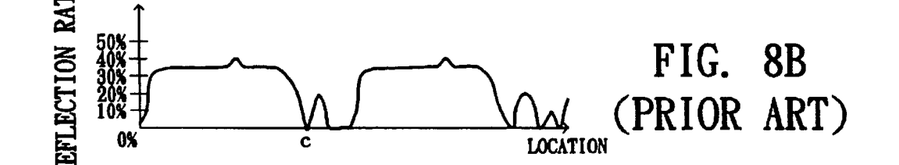
FIG. 8B is a diagram of reflection ratio versus location on the liquid crystal layer in FIG. 8A.

FIG. 8A illustrates the LCOS in FIG. 6A driven by the two-column inversion driving method. Referring to FIG. 8B also, a diagram of reflection ratio versus location on the liquid crystal layer in FIG. 8A is shown. When the pixel electrodes 602 and 604 are supplied with a voltage of +3.6 V while the pixel electrodes 606 and 608 are supplied with a voltage of −3.6 V, the liquid crystal molecules 616, originally normal to the pixel electrodes 602 to 608, are to be twisted. However, since the voltages applied to the adjacent pixel electrodes 604 and 606 are in inverse polarities, an electric field in transverse direction occurs between the two adjacent pixel electrode. That is, in the proximity of the groove 612, an electric field occurs in the direction from the pixel electrodes 604 to 606, in parallel to the X-axis. Besides, the fringe field effect of the electric field between the pixel electrodes 604 and 606 on the electric field in the proximity of the groove 612 causes the distribution of electric field to be irregular, resulting in the irregular inclinations of the liquid crystal molecules near the groove 612. Therefore, the reflection ratios, between the pixel electrodes 604 and 608, that are expected to be 40% are now reduced to 0%, such as that indicated by the point c.

Figure 9A:
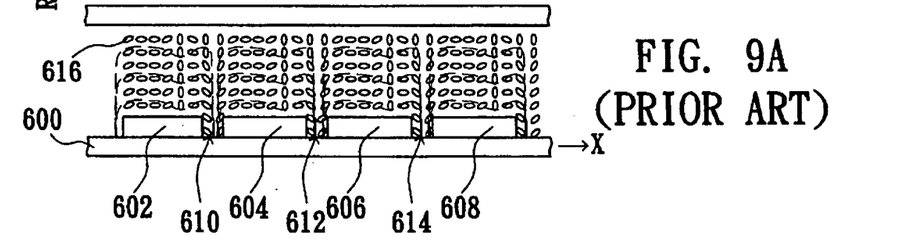
FIG. 9A illustrates the LCOS in FIG. 6A driven by the dot inversion driving method.
Figure 9B:
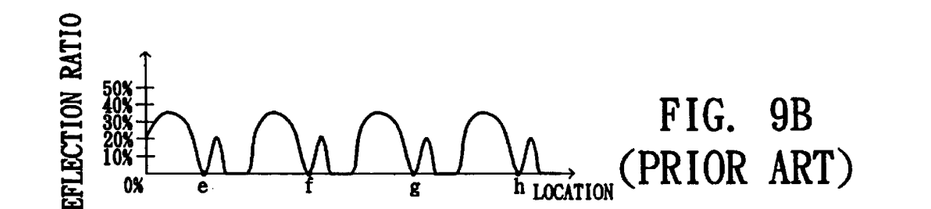
FIG. 9B is a diagram of reflection ratio versus location on the liquid crystal layer in FIG. 9A.

FIG. 9A illustrates the LCOS in FIG. 6A driven by the dot inversion driving method. Referring to FIG. 9B also, a diagram of reflection ratio versus location on the liquid crystal layer in FIG. 9A is shown. The pixel electrodes 604 and 608 are supplied with a voltage of +3.6 V while the pixel electrodes 602 and 606 are supplied with a voltage of −3.6 V. Since the adjacent pixel electrodes 602 and 604 (604 and 606; 606 and 608) are supplied with the voltages in inverse polarities, a transverse electric field in the direction of X-axis occurs between the two adjacent pixel electrodes. Besides, the fringe field effect of the electric fields between the pixel electrodes 602, 604, 606, and 608 causes the distribution of the electric fields in the proximity of the grooves 610, 612, and 614, respectively, to be irregular. This results in the regular inclinations of the liquid crystal molecules 616 near the edges of the pixel electrodes 602 to 608. Hence, the reflection ratios of the pixel electrodes 602, 604, 606, and 608 are reduced, and in the worst case, reflection ratios of zero occur on several points, such as points e, f, g, and h, as shown in FIG. 9B.

As can be examined from the performance of the above three driving methods (illustrated by FIGS. 6A–9B) for the conventional LCOS, irregular inclinations occur in the liquid crystal molecules near the pixel electrodes of the conventional LCOS because of the fringe field effect of electric field produced by the pixel electrodes and the effect of transverse electric fields produced by adjacent pixel electrodes supplied with voltages in inverse polarities, e.g., in dot inversion. Thus, the reflection ratios in the regions of the pixels are reduced. In the worst case, black stripes would even occur in the pixel regions, degrading the display quality of the LCOS. Therefore, the loss of light transmission because of irregular molecule arrangement by the transverse electric field and fringe field effect is a critical problem in the development of the single-domain vertical alignment mode LCOS desired to be resolved.

SUMMARY OF THE INVENTION

It is therefore an object of the invention to provide a liquid crystal on silicon (LCOS) panel in single-domain vertical alignment mode. By a special configuration of protrusions and grooves among the pixels of the LCOS panel, a single domain is easily formed in every pixel while high contrast ratio, reduced fringe field effect and effect of transverse electric field can be achieved.

The invention achieves the above-identified object by providing an LCOS panel in single-domain vertical alignment mode. The LCOS panel includes a front plate, a rear plate, and a liquid crystal layer. The rear plate includes a number of pixel electrodes and the pixel electrodes are grouped in pairs. Every two pairs of pixel electrodes are separated by a groove while the pixel electrodes in each pair are separated by a protrusion. The LCOS panel is filled with the liquid crystal layer, between the front and rear plates, while the liquid crystal molecules in the liquid crystal layer are in vertical alignment mode.

The invention employs liquid crystal molecules in vertical alignment mode to increase the contrast ratio of the LCOS panel. In addition, in order to form a single domain in every pixel, the invention uses a structure with protrusions and grooves to produce a pushing and pulling effect on the liquid crystal molecules, causing the liquid crystal molecules to incline rapidly to a specific direction. In this way, the structure not only regulates the inclination of the liquid crystal molecules, but also reduces fringe field effect and effect of transverse electric field on the inclination of them.

Other objects, features, and advantages of the invention will become apparent from the following detailed description of the preferred but non-limiting embodiments. The following description is made with reference to the accompanying drawings.

DETAILED DESCRIPTION OF THE INVENTION

The technical feature of the invention is the application of a structure with protrusions and grooves to a liquid crystal on silicon (LCOS) panel, wherein the pixel electrodes of the LCOS are grouped in pairs, every two pairs of the pixel electrodes are separated by a groove, and the pixel electrodes of each pair of the pixel electrodes are separated by a protrusion. By the structure with protrusions and grooves, single-domain liquid crystal molecules in vertical alignment (VA) mode can be formed smoothly, and the fringe field effect and the effect of the transverse electric field are reduced.

Figure 10A:
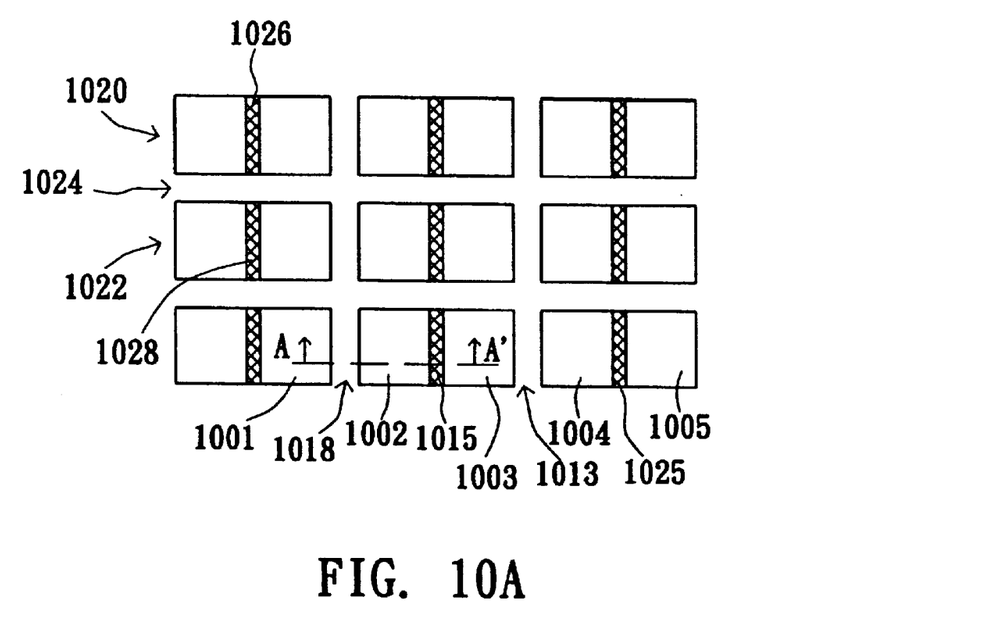
FIGS. 10A, 10C, and 10D are top views of the arrangement of pixels of an LCOS according to a first embodiment of the invention.

FIG. 10A illustrates the arrangement of the pixels of an LCOS according to a first embodiment of the invention, wherein nine pairs of pixel electrodes are representative of the pixel electrodes of the LCOS. The pixel electrodes of the LCOS, such as pixel electrodes 1001, 1002, 1003, 1004, and 1005, are grouped in pairs, such as pixel electrode pairs 1020 and 1022. Every two pairs of the pixel electrodes are separated by a groove, such as grooves 1013 and 1018. The pixel electrodes of each pair of pixel electrodes are separated by a protrusion, such as protrusion 1015.

Figure 10B:
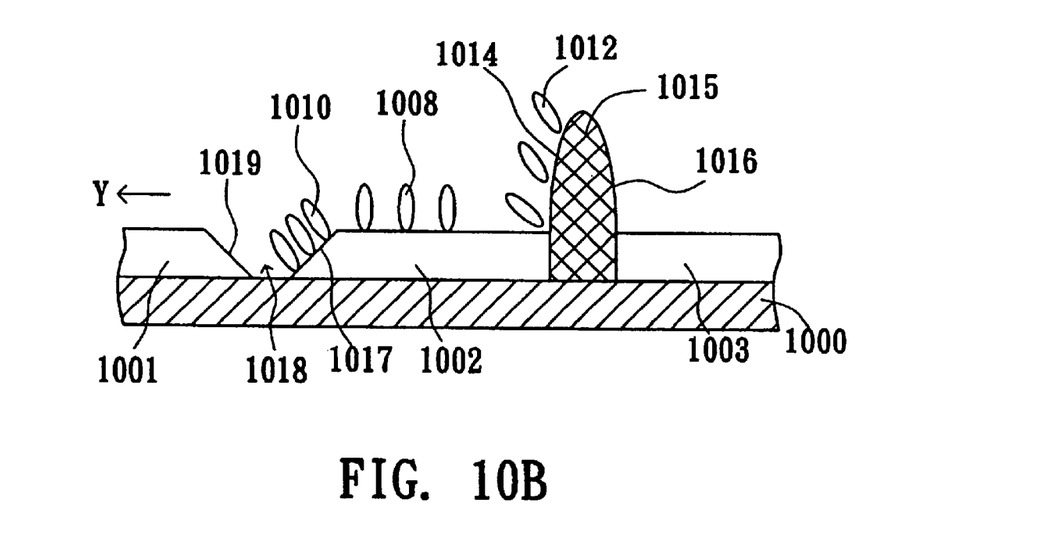
FIG. 10B is a cross-sectional view taken along line AA' shown in FIG. 11A.

FIG. 10B is a cross-sectional view taken along line AA', illustrating the effect of the protrusion 1015 and the groove 1018 on the liquid crystal molecules. In FIG. 10B, the pixel electrodes 1001, 1002, and 1003 are formed separately on an insulating layer 1000. The pixel electrodes 1002 and 1003 are paired and separated by the protrusion 1015, while the pixel electrode 1002 is separated from another pixel electrode 1001 by the groove 1018. The protrusion 1015 is higher than the pixel electrode 1002 as well as the pixel electrode 1003 while the depth of the groove 1018 can be equal to the height of either of the pixel electrodes 1001 and 1002. In addition, the cross-section of the protrusion 1015 is similar to a triangle, and the protrusion 1015 has a left side 1014 and a right side 1016. The groove 1018 has a left incline 1019 and a right incline 1017. The pixel electrodes 1001, 1002, and 1003 are covered by a number of reflection layers (not shown), respectively. Besides, an alignment film (not shown) covers the pixel electrodes 1001, 1002, 1003, the protrusion 1015, and the groove 1018. Affected by the alignment film, the liquid crystal molecules 1010, 1008, and 1012, as no voltage is applied to them, are arranged vertically on the right incline 1017 of the groove 1018, the upper surface of the pixel electrode 1002, and the left side 1014 of the protrusion 1015, respectively.

Moreover, when no voltage is applied, the liquid crystal molecule 1010 is located on the right incline 1017 of the groove 1018, inclining to the Y-direction at a first inclination angle while the liquid crystal molecule 1012 is located on the left side 1014 of the protrusion 1015, inclining to the Y-direction at a second inclination angle. The inclination of the liquid crystal molecule 1012 produces a push on the liquid crystal molecule 1010 to the Y-direction and the inclination of the liquid crystal molecule 1012 produces a pull on the liquid crystal molecule 1018 to the Y-direction. By the effect of the push and pull, when a voltage is applied to the pixel electrode 1002, the liquid crystal molecules over the pixel electrode 1002 are to be inclined to the Y-direction, forming single domain for the LCOS. Because of the structure with the protrusion 1015 and groove 1018, the formation of single domains can be effectively achieved. Therefore, in the invention, it is unnecessary for the alignment film to use rubbing process to control the inclination of the liquid crystal molecules when voltages are applied.

Likewise, the liquid crystal molecules (not shown) on the right side of the protrusion 1015 incline to the Y-direction. When a voltage is applied to the pixel electrode 1003, liquid crystal molecules over the pixel electrode 1003 will incline to the Y-direction, forming a single domain.

The formation of the protrusion 1015 between the pixel electrodes 1002 and 1003 is advantageous to the reduction in the effects of the fringe field and transverse field between the pixel electrodes 1002 and 1003, resulting in enhanced uniformity of the arrangement of the liquid crystal molecules between the pixel electrodes 1002 and 1003. By the invention, the problem of irregular reduction in reflection ratio and the production of black stripes in the pixel regions for the conventional liquid crystal on silicon panels can be effectively resolved and the display quality can be thus enhanced.

In FIG. 10A, two adjacent pixel-electrode pairs disposed in the transverse direction are separated by a groove.

Figure 10C:
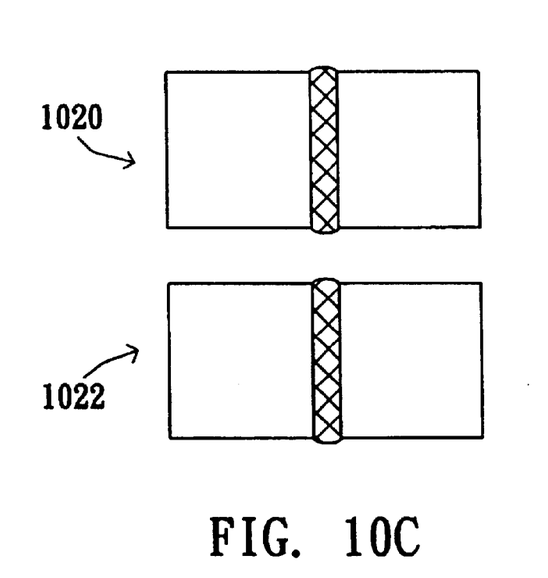
Figure 10D:
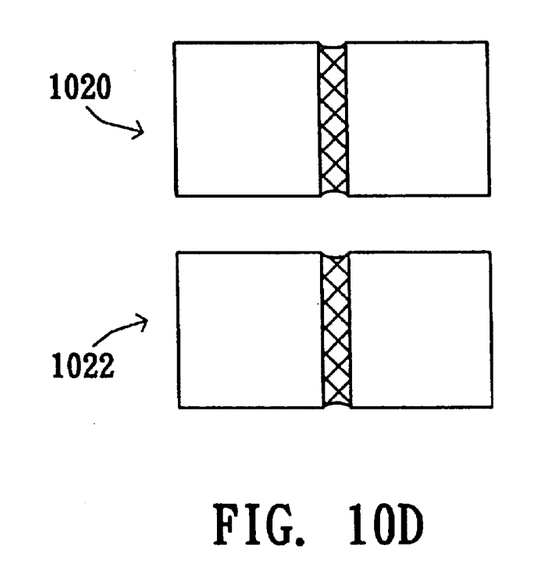

Similarly, two adjacent pixel-electrode pairs disposed in the vertical direction, e.g., the pixel-electrode pairs 1020 and 1022, are separated by a groove, e.g., groove 1024. The protrusion 1026 of the pixel-electrode pair 1020 is separated from the protrusion 1028 of the pixel-electrode pair 1022 by the groove 1024, also. The edges of the protrusions 1026 and 1028 near the groove 1024 can be clean edges. Besides, they can be outward edges as shown in FIG. 10C; or can be inward edges as shown in FIG. 10D.

Moreover, according to the invention, the LCOS panel uses a glass substrate (not shown) with no pattern for the pixel electrodes. In this way, in the manufacturing process for an LCOS panel of the invention, the position of its front and rear plates can be readily to be regulated, thus enhancing the yield of the panel. The front and rear plates are spaced apart for a cell gap H.

In the following, the LCOS panel according to the invention is driven by different driving methods. The arrangements of its liquid crystal molecules and the corresponding reflection ratios are illustrated.

Figure 11A:
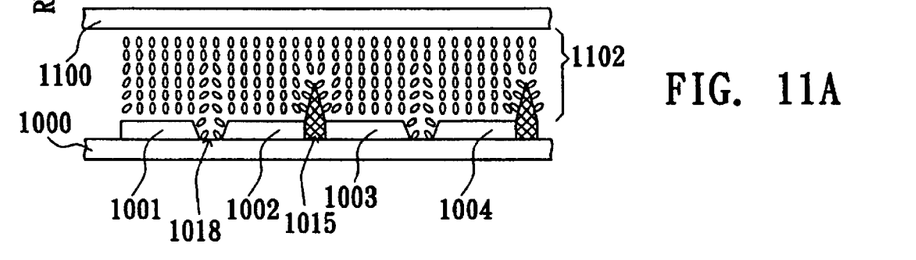
FIG. 11A illustrates the LCOS according to the first embodiment illustrated in FIGS. 10A and 10B when no voltage is applied to a liquid crystal layer of the LCOS.
Figure 11B:
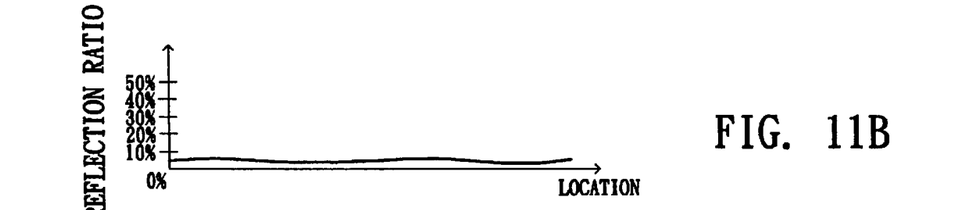
FIG. 11B is a diagram of reflection ratio versus location on the liquid crystal layer shown in FIG. 11A.

FIG. 11A illustrates the arrangement of the liquid crystal molecules of a LCOS panel in vertical alignment mode according to a first embodiment when no voltage is applied. Referring to FIG. 11B also, it shows a diagram of reflection ratio versus location on a liquid crystal layer 1102. The arrangement of the liquid crystal molecules of the liquid crystal layer 1102 is determined by the potential differences between the a transparent electrode 1100, the pixel electrodes 1001, 1002, 1003, and 1004, and the direction of the electric field induced between them. When no voltage is applied, the LCOS panel has a reflection ratio of 0%, substantially.

Figure 12A:
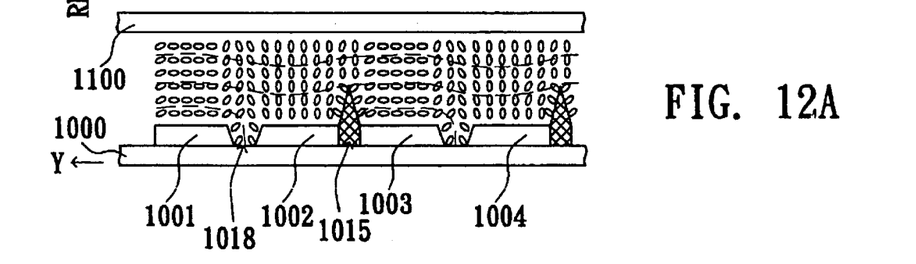
FIG. 12A illustrates the LCOS shown in FIG. 11A driven by the frame inversion driving method.
Figure 12B:
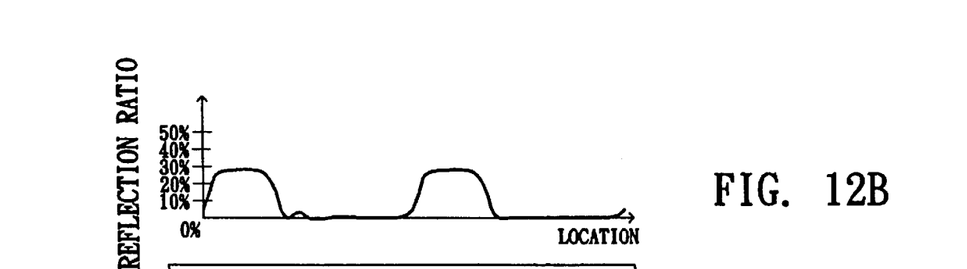
FIG. 12B is a diagram of reflection ratio versus location on the liquid crystal layer shown in FIG. 12A.

FIG. 12A illustrates the LCOS panel in FIG. 11A driven by frame inversion. FIG. 12B shows a diagram of reflection ratio versus location on the liquid crystal layer in FIG. 12A. The pixel electrodes 1001 and 1003 are supplied with a voltage of +3.6 V while the pixel electrodes 1002 and 1004 are supplied with a voltage of +1.5 V. As shown in FIG. 12A, when voltages are applied, the liquid crystal molecules twist in different angles corresponding to the supply voltages of different values, so as to provide different reflection ratios. Affected by the protrusion 1015 and the groove 1018, the liquid crystal molecules over the pixel electrode 1002 incline to the Y-direction while the liquid crystal molecules over the pixel electrode 1001 incline to the inverse of Y-direction. In the proximity of the groove 1018, because the liquid crystal molecules between the pixel electrodes 1001 and 1002 are squeezed by the liquid crystal molecules that incline to different directions on both sides of the groove 1018, they are arranged in the direction approximately vertical to the Y-direction, and have a reflection ratio of 0%. As shown in FIG. 12B, over the pixel electrodes 1001 and 1003, the reflection ratio maintains at about 25% and no gray region as shown in FIGS. 7A and 7B occurs.

Figure 13A:
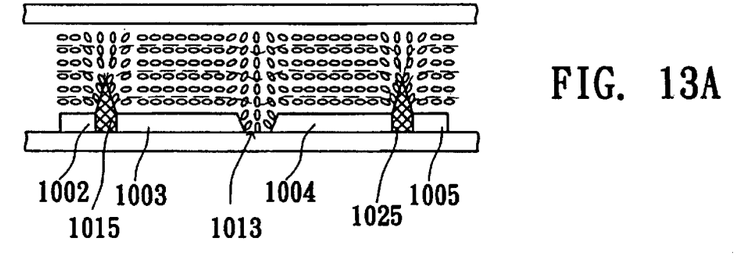
FIG. 13A illustrates the LCOS shown in FIG. 11A driven by the two-column inversion driving method.
Figure 13B:
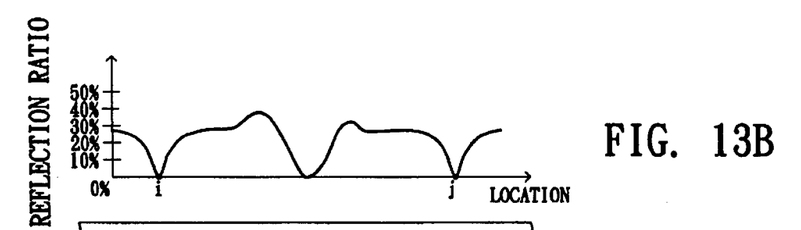
FIG. 13B is a diagram of reflection ratio versus location on the liquid crystal layer shown in FIG. 12A.

FIG. 13A illustrates the LCOS panel in FIG. 11A driven by two-column inversion. FIG. 13B shows a diagram of reflection ratio versus location on the liquid crystal layer in FIG. 13A. The pixel electrodes 1003 and 1004 are supplied with a voltage of −3.6 V while the pixel electrodes 1002 and 1005 are supplied with a voltage of +3.6 V. On either side of the groove 1013, since the pixel electrodes 1003 and 1004 are in the same polarity, the fringe field effect and transverse field effect are insignificant and do not degrade the display quality of the corresponding pixels. On either side of the protrusion 1015, the pixel electrodes 1002 and 1003 are in the opposite polarities, a transverse field is present between the two pixel electrodes. However, since the protrusion 1015 produces a force much larger than the force produced by the transverse field, the liquid crystal molecules maintains in regular arrangement. Therefore, the liquid crystal molecules near the protrusion 1015 will not twist irregularly as that in the conventional approaches, thus avoiding the display quality from being degraded. As compared with the LCOS indicated by FIGS. 8A and 8B, the LCOS indicated by FIGS. 13A and 13B provides a better display quality and has only having 0% reflection ratio at points i and j. Although the points i and j are indicative of reflection ratios of 0%, since their locations are associated with the protrusions 1015 and 1025, which are opaque regions, the display quality of the whole LCOS are not degraded.

Figure 14A:
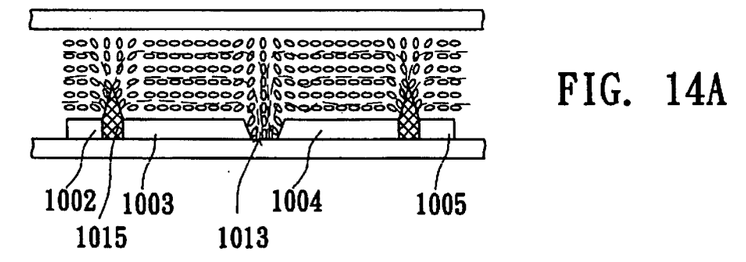
FIG. 14A illustrates the LCOS shown in FIG. 11A driven by the dot inversion driving method.
Figure 14B:
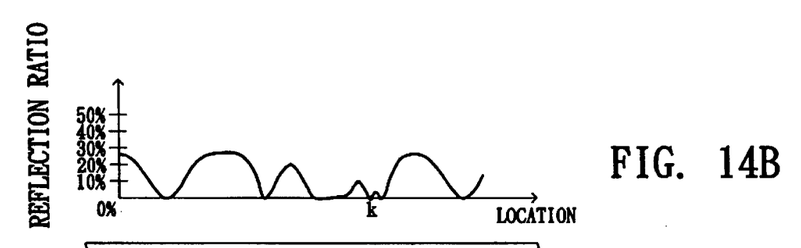
FIG. 14B is a diagram of reflection ratio versus location on the liquid crystal layer shown in FIG. 14A.

FIG. 14A illustrates the LCOS panel in FIG. 11A driven by dot inversion. FIG. 14B shows a diagram of reflection ratio versus location on the liquid crystal layer in FIG. 14A. The pixel electrodes 1003 and 1005 are supplied with a voltage of −3.6 V while the pixel electrodes 1002 and 1004 are supplied with a voltage of +3.6 V. On either side of the groove 1013, since the pixel electrodes 1003 and 1004 are supplied with voltages in opposite polarities, a transverse field is produced. Thus, it results in the liquid crystal molecules near the groove 1013 arranged irregularly and gray points, such as a point k, are displayed. In this example, when the pixel electrodes are supplied with the voltages in opposite polarities, the effect of the transverse field produced is unable to be avoided. However, as compared with the display quality presented by the LCOS in FIGS. 9A and 9B, the display quality presented by the LCOS in FIGS. 13A and 13B is better. In addition, when the slopes of the two inclines of the groove are reduced, the aperture of the groove becomes larger, allowing further improvement of the display quality.

As examined from the three driving methods (illustrated in FIGS. 11A–14B), it shows that the structure which has protrusions and grooves other than using rubbing process and the way which makes the liquid crystal molecules arranged in one single direction in one single pixel can effectively reduce the fringe field effect as well as the transverse field effect and enhance the display quality of the single domain vertical alignment mode LCOS. Among the three driving methods, the frame inversion and two-column inversion can be used to drive the vertical alignment mode LCOS according to the invention, obtaining better display quality.

Moreover, the results presented by FIGS. 11A–14B provides a reason why the protrusions are not suitable to be substitute for the grooves. If two protrusions are disposed on either sides of a pixel electrode, pushes from the two sides will exert on the liquid crystal molecules over the pixel electrode, resulting in the liquid crystal molecules in the middle of the pixel electrode to be twisted to normal or an undesired direction even in the presence of an electric field. Accordingly, a black stripe will be formed in the middle of the pixel electrode so that black points are displayed on the LCOS.

In theory, the heights of the protrusions are expected to be as higher as possible. The higher the protrusions the larger the pushes on the liquid crystal molecules. In the invention, the heights of protrusions can be at least ⅕ of cell gap H, and, preferably, ⅓ of cell gap H. However, the yield of the LCOS reduces as the protrusions become higher. In addition to the size and shape of the protrusions, the electric field near the protrusions can be affected by the material for the protrusions. When a voltage is applied to the LCOS, the pushes of the liquid crystal molecules near the protrusions with low dielectric constant are larger. Thus, materials for the protrusions are preferably to be low dielectric constant materials, e.g., silicon dioxide with a dielectric constant of 3.9, or other material having a dielectric constant approximate to 3.9. In general, a good performance can be obtained by using materials of a dielectric constant of 10 to form the protrusions.

Figure 15A:
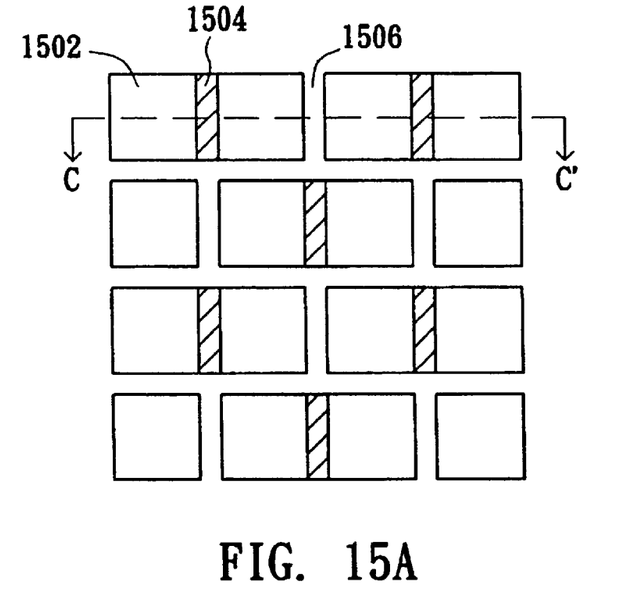
FIG. 15A is a top view of an LCOS according to a second embodiment of the invention.
Figure 15B:
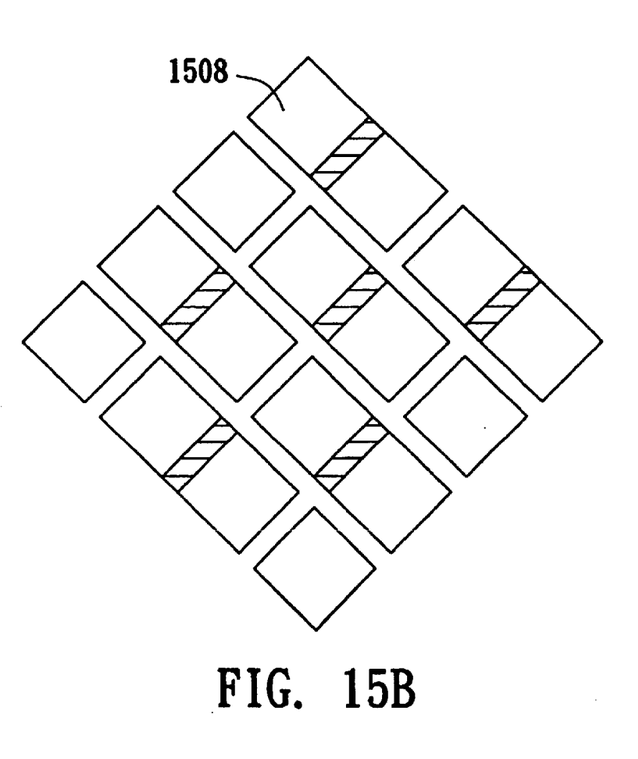
FIG. 15B is a top view of an LCOS according to a third embodiment of the invention.

Further, the pixel electrodes on the LCOS can be paired in a way other than that illustrated in FIG. 1A. FIG. 15A shows an LCOS according to a second embodiment of the invention in a top view. The LCOS has a number of pairs of pixel electrodes, protrusions, and grooves. For the pairs of pixel electrodes, such as the pixel-electrode pair 1502, the protrusions between and the grooves near the pairs of pixel electrodes, such as the protrusion 1504 and the groove 1506, are arranged alternately so that, as viewed along the rows and columns of the protrusions of the LCOS, there is one groove between two adjacent protrusions, and as viewed along the rows and columns of the grooves of the LCOS, there is one protrusion between two adjacent grooves. Referring to FIG. 15B, a top view of an LCOS is shown according to a third embodiment of the invention, wherein its pixel electrodes are arranged in a diamond form. As shown in FIG. 15B, the structure with protrusions and grooves of the invention can be applied to the pixel electrodes 1508 arranged in the diamond form. The arrangement of the pixel electrodes in a diamond form can be applied to projection televisions so as to provide an enhanced display quality.

Figure 16A:
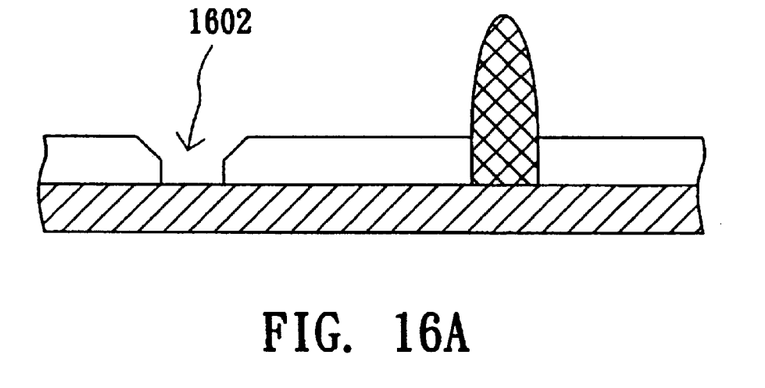
FIGS. 16A–16C illustrate various protrusions and grooves according to the invention.
Figure 16B:
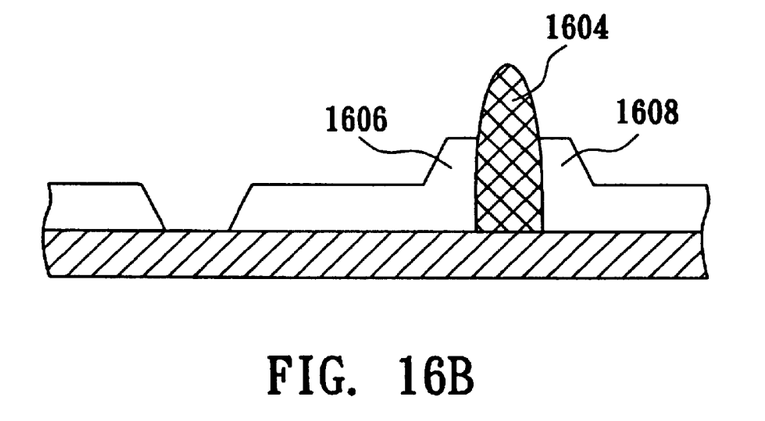
Figure 16C:
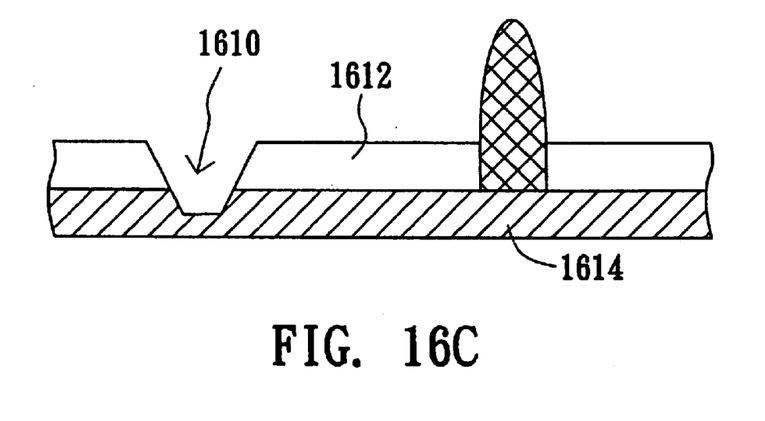

As described above, the structure with protrusions and grooves does effectively reduce the fringe field effect and transverse field effect occurred in an LCOS. Moreover, the protrusions and grooves can be designed in different sizes and shapes. The structures with protrusions and grooves with different shapes are illustrated in FIGS. 16A to 16C. A groove 1602 can be formed with two inclines at different slopes, as shown in FIG. 16A. In FIG. 16B, a protrusion 1604 can be further covered with pixel electrodes 1606 and 1608. In FIG. 16C, the depth of a groove 1610 can be larger than the thickness of a pixel electrode 1612. For obtaining a deeper groove such as the groove 1610 shown in FIG. 16C, a portion of an insulating layer 1614 can be etched by using a manufacturing process with yellow light. Certainly, the inclines of the groove 1610 can be steeper, e.g., with an inclination of 70°. In brief, any structure with protrusions and grooves that produces a single domain of the liquid crystal molecules for a pixel so that the single domains produced on two sides of the protrusions are in different directions is under the scope of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal on silicon (LCOS) panel, comprising:
   a front plate;
   a rear plate including a plurality of pixel electrodes, wherein the pixel electrodes are grouped in pairs, every two pairs of the pixel electrodes are separated by a groove, and the pixel electrodes of each pair of the pixel electrodes are separated by a protrusion; and
   a liquid crystal layer, with which the space between the front plate and rear plate is filled, wherein the liquid crystal layer has liquid crystal molecules in vertical alignment mode.

2. The LCOS panel according to claim 1, wherein the protrusion is made of dielectric material of low dielectric constant.

3. The LCOS panel according to claim 2, wherein the protrusion has a dielectric constant of smaller than 10.

4. The LCOS panel according to claim 2, wherein the protrusion is made of silicon dioxide.

5. The LCOS panel according to claim 1, wherein the front plate and the second plate are apart in a cell gap and the protrusion has a height of at least one fifth of the cell gap.

6. The LCOS panel according to claim 1, wherein the groove has a first inclination and a second inclination, and the first inclination is opposite to the second inclination.

7. The LCOS panel according to claim 1, wherein the protrusions and the grooves are arranged alternately.

8. The LCOS panel according to claim 1, wherein the groove has a depth equal to that of the pixel electrodes.

9. The LCOS panel according to claim 1, wherein the rear plate further comprises an insulating layer, the pixel electrodes are disposed above the insulating layer, and the groove has a depth larger than that of the pixel electrodes.

* * * * *